O. H. PICHER.
METHOD OF TREATING ARGENTIFEROUS LEAD ORES.
APPLICATION FILED JULY 3, 1905. RENEWED SEPT. 30, 1908.
920,388.
Patented May 4, 1909.
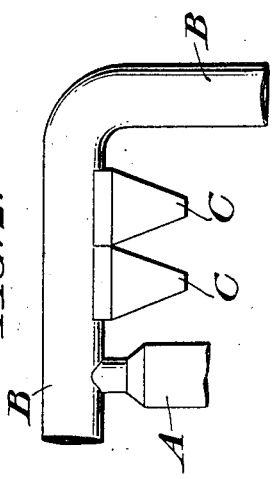
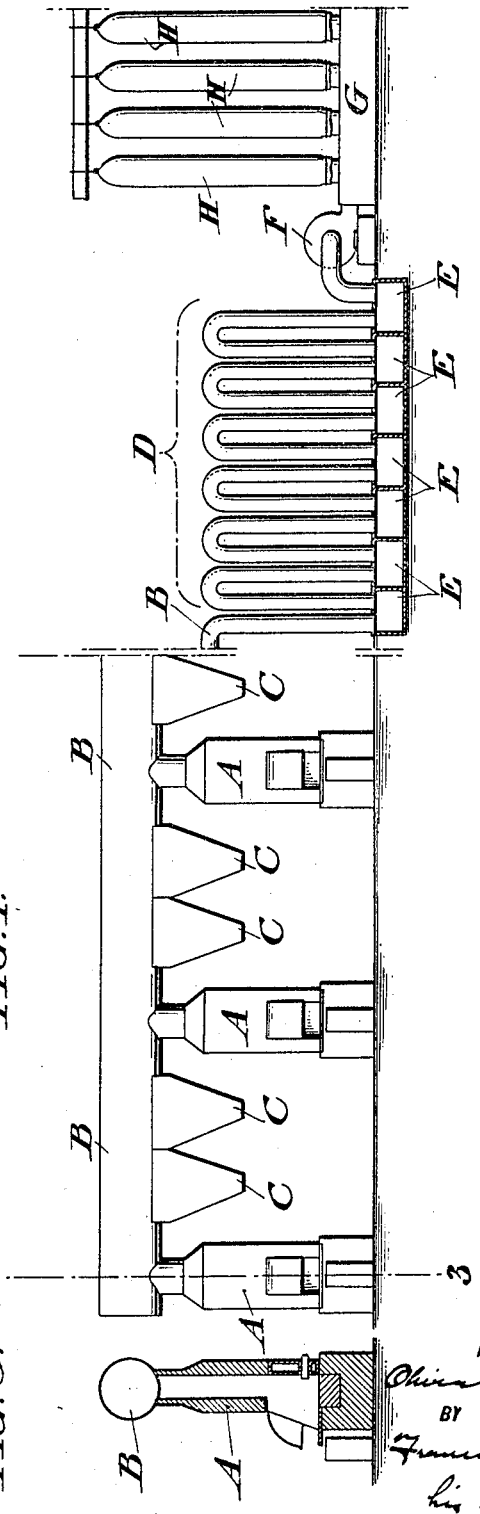

UNITED STATES PATENT OFFICE.

OLIVER H. PICHER, OF JOPLIN, MISSOURI.

METHOD OF TREATING ARGENTIFEROUS LEAD ORES.

No. 920,388.      Specification of Letters Patent.      Patented May 4, 1909.

Application filed July 3, 1905, Serial No. 268,080. Renewed September 30, 1908. Serial No. 455,395.

*To all whom it may concern:*

Be it known that I, OLIVER H. PICHER, a citizen of the United States of America, residing in Joplin, in the county of Jasper, in the State of Missouri, have invented a certain new and useful Improvement in Methods of Treating Argentiferous Lead Ores, of which the following is a true and exact description, reference being had to the accompanying drawings, which form a part thereof.

My invention relates to the treatment of argentiferous lead ores containing sulfur and has for its object the economical utilization of such ores for the production of non-argentiferous lead products, preferably pig lead and sublimed white lead and of desulfurized argentiferous products suitable for further treatment for the production of silver and lead.

Sulfid ores containing lead and silver have hitherto been treated for the extraction of their metallic values in the best practice by processes which involved a preliminary roasting of the ores to drive off their contained sulfur, such roasting either taking place in a roasting furnace or as a preliminary stage of the treatment in a reverberatory furnace. This preliminary roasting of the ores results in the loss of considerable percentages of their metallic values and of course involves a very material preliminary expense. In the case of non-argentiferous lead ores containing sulfur it is well known that such ores can be successfully treated with desulfurization in open hearth furnaces for the partial reduction and partial sublimation of their lead contents, the fume being caught in screens and afterward treated for the production of lead or lead and sublimed white lead, but argentiferous ores have not heretofore been used in this way because of the well known fact that a material percentage of their silver contents would be driven from the furnace with the lead fume and presumably lost. I have discovered that by treating such sulfid ores without previous desulfurization in an open hearth furnace and at comparatively low temperature there is produced, in addition to the silver bearing or "gray" slag and argentiferous base bullion, an argentiferous dust and the blue fume of lead compounds and carbon dust which dust and fume issue from the furnace with the gases and can be practically entirely separated from each other by subsidence of the dust in a system of flues and settling chambers so that at the end of such flue system the furnace gases and blue fume are practically non-argentiferous. The fume is then separated by screening from the furnace gases and subsequently treated for the recovery of its non-argentiferous lead contents and preferably in a sublimation furnace for the production of pig lead and sublimed white lead. The argentiferous slag and dust from the furnace and flues is in good condition for subsequent treatment and the economical recovery of the silver and other metallic contents therefrom by any of the usual well known methods.

In the drawing in which I have illustrated a plant suitable for use in connection with my new process, Figure 1 is a diagrammatic representation of a plant suitable for the carrying out of my process, the portion at the right side of the drawing being shown in smaller scale than the remainder of the figure. Fig. 2 is an elevation showing the junction of the furnace flue and cooling system and Fig. 3, a sectional side elevation of the furnace.

A, A, A, are open hearth furnaces of the Scotch hearth type, B, is a horizontal flue leading from said furnaces and provided with a series of dust collecting hoppers C, C, etc., leading to a system of cooling flues D, having dust collecting chambers connected therewith, as shown at E, E, etc.

F, is a fan used to draw the gases and fumes through the flues and to force them through the flue G, into the fabric screens or bags H.

In practical operation the sulfid ore of lead and silver in admixture with carbon is treated in the open hearth furnaces, the treatment being such that a compound reducing and oxidizing action is obtained, and at a comparatively low temperature. The gaseous products of the furnace together with the admixed dust and fume are carried through the system of settling and cooling flues to effect the separation of the argentiferous dust by subsidence and the cooling of the gases, and the practically non-argentiferous blue fume is finally separated from the gas by the screen system.

The recovered blue fume is treated for the recovery of its non-argentiferous lead contents in any convenient way, preferably after being burned in the well known way to form crusts or cinders for further furnace treatment, it is then subjected to a compound reducing and oxidizing treatment at high temperature as in the familiar practice of making sublimed white lead from non-argentiferous ores, such treatments producing pig lead practically free from silver and sublimed white lead which is separated from the furnace gases by screens in the well known manner.

The material advantage of my new process lies in the economical extraction of metal and metallic products from the sulfid ores of lead and silver, the economies residing chiefly in the facts, first, that I treat the raw ore without previous desulfurization and recover practically all of its metallic contents and, second, that I produce from such ores a non-argentiferous sublimed white lead which has heretofore been unattainable from such sources and which is a valuable product, and which, if considered as a by-product, materially lessen the cost of treating the ore as contrasted with previous methods for treatment of such ores.

Having now described my invention, what I claim as new and desire to secure by Letters Patent is—

1. The method of treating argentiferous lead ores containing sulfur for the economical production of lead products free from silver and of argentiferous products, which consists in subjecting the ore, mixed with carbon and without previous desulfurization, to a compound reducing and oxidizing treatment at comparatively low temperature in an open hearth furnace in order to produce argentiferous base bullion, gray slag and dust, and also non-argentiferous lead fumes leaving the furnace in admixture with the dust and furnace gases, then causing the argentiferous dust to separate from the gases and lead fume by subsidence in a system of flues and settling chambers, then separating the lead fume from the gases by screening.

2. The method of treating argentiferous lead ores containing sulfur for the production of sublimed white lead free from silver and of argentiferous products, which consists in subjecting the ore mixed with carbon and without previous desulfurization to a compound reducing and oxidizing treatment at comparatively low temperature in an open hearth furnace in order to produce argentiferous base bullion, gray slag and dust and also non-argentiferous lead fumes leaving the furnace in admixture with the dust and furnace gases, then causing the argentiferous dust to separate from the gases and lead fume by subsidence in a system of flues and settling chambers, then separating the lead fume from the gases by screening and then subjecting the lead fume to a compound reducing and oxidizing treatment at high temperature to produce from it sublimed white lead and pig lead.

OLIVER H. PICHER.

Witnesses:
ARNOLD KATZ,
D. STEWART.